US012285852B2

(12) United States Patent
Xu

(10) Patent No.: US 12,285,852 B2
(45) Date of Patent: Apr. 29, 2025

(54) IMPACT DRIVER ANVIL

(71) Applicants: APEX BRANDS, INC., Apex, NC (US); Jacobs Chuck Manufacturing (Suzhou) Company, LTD., Suzhou (CN)

(72) Inventor: Huangsheng Xu, Suzhou (CN)

(73) Assignees: APEX BRANDS, INC., Apex, NC (US); JACOBS CHUCK MANUFACTURING (SUZHOU) COMPANY, LTD., Suzhou (CN)

(*) Notice: Subject to any disclaimer, the term of this patent is extended or adjusted under 35 U.S.C. 154(b) by 0 days.

(21) Appl. No.: 18/032,660

(22) PCT Filed: Nov. 4, 2020

(86) PCT No.: PCT/CN2020/126446

§ 371 (c)(1),
(2) Date: Apr. 19, 2023

(87) PCT Pub. No.: WO2022/094788

PCT Pub. Date: May 12, 2022

(65) Prior Publication Data

US 2023/0381940 A1 Nov. 30, 2023

(51) Int. Cl.
*B25D 17/06* (2006.01)
*B25B 21/02* (2006.01)

(52) U.S. Cl.
CPC .............. *B25D 17/06* (2013.01); *B25B 21/02* (2013.01); *B25D 2217/0015* (2013.01)

(58) Field of Classification Search
CPC ............ B25D 17/06; B25D 2217/0015; B25D 2222/42; B25B 21/02

(Continued)

(56) References Cited

U.S. PATENT DOCUMENTS 5,542,479 A 8/1996 Stachler et al.
5,868,047 A 2/1999 Faust et al.

(Continued)

FOREIGN PATENT DOCUMENTS

CN 211805940 U 10/2020
DE 102011007699 A1 * 10/2012 ............. B25D 17/06
WO WO-2015182512 A1 * 12/2015 ............. B25B 21/02

OTHER PUBLICATIONS

International Search Report and Written Opinion of corresponding International Application No. PCT/CN2020/126446 mailed on Aug. 3, 2021, all enclosed pages cited.

(Continued)

*Primary Examiner* — Stephen F. Gerrity
*Assistant Examiner* — Linda J Hodge
(74) *Attorney, Agent, or Firm* — BURR & FORMAN LLP

(57) ABSTRACT

An anvil for use with a power tool may include a shank and ram lug. The stank may have a first end and a second end. The ram lug may extend radially from the second end of the shank. The am lug may include an impact surface configured to receive an impact force from a hammer of the power tool and an impact layer comprising the impact surface. The impact layer may have been formed via a treatment process to have an impact layer depth to an impact layer transitional material interface with an interior region of the ram lug. The impact layer may have a first hardness and the interior region of the ram lug may have a second hardness. The first hardness may be greater than the second hardness.

20 Claims, 7 Drawing Sheets

(58) Field of Classification Search
USPC .......................................................... 173/93
See application file for complete search history.

(56) References Cited

U.S. PATENT DOCUMENTS

| | | | | |
|---|---|---|---|---|
| 6,047,779 | A | 4/2000 | Wallace | |
| 6,223,834 | B1 | 5/2001 | Takamura et al. | |
| 2006/0151188 | A1* | 7/2006 | Bodine | B25B 23/0035 173/104 |
| 2007/0187125 | A1* | 8/2007 | Sterling | B25B 21/02 173/162.1 |
| 2007/0266545 | A1 | 11/2007 | Bodine et al. | |
| 2011/0042146 | A1 | 2/2011 | Lachmann et al. | |
| 2012/0118597 | A1 | 5/2012 | Hauptmann et al. | |
| 2021/0362308 | A1* | 11/2021 | Li | B25D 11/04 |

OTHER PUBLICATIONS

Extended European Search Report issued in European Application No. 20960250.7 on Jun. 3, 2024, all enclosed pages cited.

* cited by examiner

IMPACT DRIVER ANVIL

TECHNICAL FIELD

Example embodiments generally relate to power tool technologies and, and in particular to impact drivers and associated components including anvils.

BACKGROUND

Impact drivers, such as an impact wrench, apply a repeating, rotational striking force onto an internal anvil to generate a rotational output that may be used to act upon a work piece, such as a fastener. This type of abrupt and recurring rotational output has proven useful in a variety of contexts, such as to remove rusted, sealed, corroded, or otherwise difficult to remove fasteners (e.g., screws, bolts, nuts, etc.), in drilling applications, and the like.

The impacts on the anvil used generate the rotational movement, result in the anvil being subjected to high-intensity, repeated blows. These impacts can fracture and weaken the anvil over time, ultimately resulting in an anvil failure. Accordingly, innovation to address the technical problem of anvil failure in the context of impact drivers is desired.

BRIEF SUMMARY OF SOME EXAMPLES

According to some example embodiments, an anvil for use with a power tool is provided. The anvil may comprise a shank and a ram lug. The shank may extend along a longitudinal axis of the anvil, and the shank may have a first end and a second end. The ram lug may extend radially from the second end of the shank along a radial axis, and the radial axis being orthogonal to the longitudinal axis. The ram lug may comprise an impact surface configured to receive an impact force from a hammer of the power tool and an impact layer comprising the impact surface. The impact layer may have been formed via a treatment process to have an impact layer depth to an impact layer transitional material interface with an interior region of the ram lug. The impact layer may have a first hardness and the interior region of the ram lug may have a second hardness, where the first hardness is greater than the second hardness.

According to some example embodiments, another example anvil for use with a power tool is provided. The anvil may comprise shank and a ram lug. The shank may extend along a longitudinal axis of the anvil, and the shank may have a first end and a second end. The shank may further comprise a head portion at the first end. The head portion may comprise a drive, and the drive may comprise a plurality of planar end effector engaging surfaces configured to engage with an end effector that is configured to be rotated by the drive to operate on a work piece. A ram lug may extend from the second end of the shank along a radial axis from the shank and may comprise an impact surface for receiving an impact force from a hammer of the power tool. The radial axis may be orthogonal to the longitudinal axis. The drive may comprise an engaging layer that may have been formed via a treatment process to have an engaging layer depth to an engaging layer transitional material interface with an interior region of the drive. The engaging layer may comprise a plurality of planar end effector engaging surfaces configured to engage with the end effector. The engaging layer may have a first hardness and the interior region of the drive may have a second hardness, where the first hardness is greater than the second hardness.

According to some example embodiments, an impact driver is provided. The impact driver may comprise a motor configured to output rotational movement in response to operation of a control switch, a hammer operably coupled to the motor to generate rotational movement of the hammer, and an anvil configured to receive an end effector for acting upon a work piece. The anvil may comprise a shank extending along a longitudinal axis of the anvil. The shank may have a first end and a second end. The anvil may further comprise a ram lug may extend radially from the second end of the shank along a radial axis. The radial axis may be orthogonal to the longitudinal axis. The ram lug may comprise an impact surface configured to receive an impact force from a hammer of the power tool and an impact layer comprising the impact surface. The impact layer may have been formed via a treatment process to have an impact layer depth to an impact layer transitional material interface with an interior region of the mm lug. The impact layer may have a first hardness and the interior region of the ram lug may have a second hardness. The first hardness may be greater than the second hardness.

According to some example embodiments, an example method for making an anvil for use with a power tool is provided. The example method may comprise heat treating a steel material and forming the steel material into the anvil. The example method may further comprise induction hardening, to a first hardness, an engaging layer formed on a drive of the anvil to an engaging layer depth defined at an engaging layer transitional material interface with an interior region of the drive. The drive may be a component of a head of a shank disposed at a first end of the shank, and the shank may extend along a longitudinal axis of the anvil. The engaging layer may comprise a plurality of planar end effector engaging surfaces of the drive configured to receive an end effector that is configured to be rotated by the drive to operate on a work piece. The example method may further comprise induction hardening, to the first hardness, an impact layer formed on a ram lug of the anvil to an impact layer depth defined at an impact layer transitional material interface with an interior region of the ram lug of the anvil. The impact layer may comprise an impact surface configured to receive an impact force from a hammer of the power tool. The ram lug may extend radially from a second end of the shank along a radial axis that is orthogonal to the longitudinal axis of the anvil. The interior region of the drive and the interior region of the ram lug may have a second hardness, and the first hardness may be greater than the second hardness.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
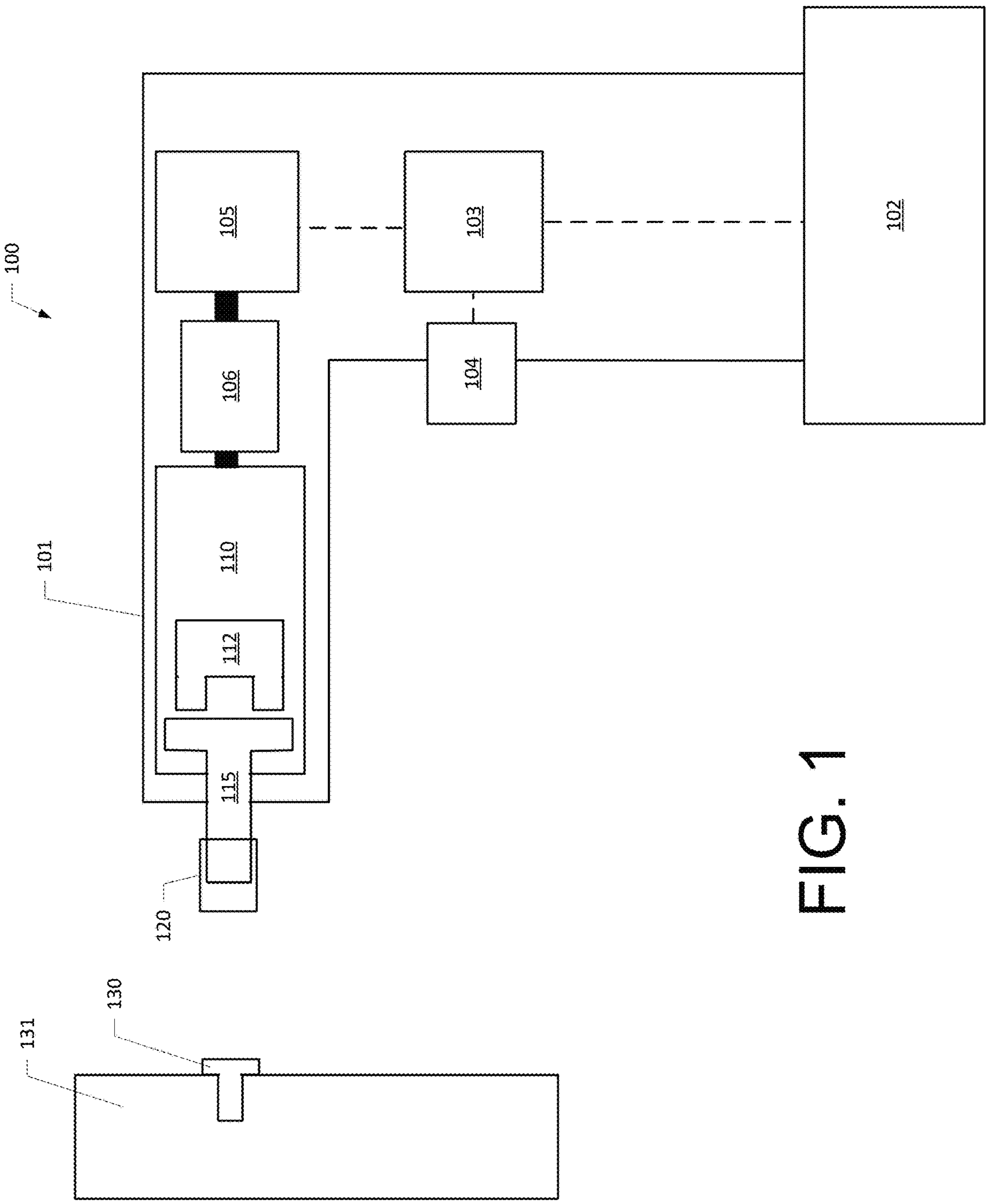
FIG. 1 illustrates a functional block diagram of an impact driver according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to some example embodiments, an improved anvil for use in an impact driver or other power tool is provided. The anvil may operate to translate an impact force applied to one more ram lugs to a drive of the anvil that is configured to receive an end effector (e.g., a socket, drill bit, or the like) to operate on a work piece (e.g., a fastener). As such, during such rotational movement, impacts may be occur at an impact surface of the ram lug, and on end effector engaging surfaces of the drive. As such, these surfaces are subjected to high, repeated impact-related stresses and are therefore likely to be locations where fractures and other failures can occur.

As such, according to some example embodiments, a treatment process is provided for forming a hardened layer of material at the impact surface of the ram lug and the end effector engaging surfaces of the drive. In this regard, an impact layer may be formed at the impact surface of the ram lug and an engaging layer may be formed at the end effector engaging surfaces of the drive. The material used to form the anvil, and be hardened in these areas of the anvil, may be steel or a steel alloy. For example, a medium-carbon steel or a chromium-nickel-molybdenum (CrNiMo) steel may be used. This material may be acted upon by a treatment process that involves heat treatment and induction hardening (also referred to as a high frequency or induction quenching). As a result of these operations, hardened and more resilient portions of the anvil may be formed as the impact layer and the engaging layer. Accordingly, the hardness of the material at these layers may be higher than the hardness of the material elsewhere in the anvil. These layers may be formed to have a desired depth by controlling various treatment parameters. A desired depth or thickness of the layers may be selected based on testing to determine optimal performance and lifetime of the anvil.

Having described some aspects of example embodiments generally, FIG. 1 illustrates a functional block diagram of an impact driver 100 to provide context according to some example embodiments. The impact driver 100 may be an impact wrench, impact drill, or other impact-based rotating power tool. The impact driver 100 may include an external housing 101, within which various operational components may be disposed. In this regard, the impact driver 100 may be powered by a power source, such as, for example, a rechargeable battery 102. The battery 102 may be configured to provide electrical power to the control circuitry 103 and the electric motor 105. The control circuitry 103 may receive a control signal from the control switch 104 (e.g., trigger) and may respond by permitting controlled electrical power to be provided to the electric motor 105. Note that while the impact driver 100 is described as being an electrical power tool, it is understood that the anvil 115 may be utilized in other types of power tools, such as, for example, pneumatic power tools.

As mentioned above, the impact driver 100 may include a motor configured to output rotational movement, such as the electric motor 105. The electric motor 105 may be configured to output a rotational movement, via a shaft, to a gear assembly 106. The gear assembly 106 may include various gearing for changing a rotational speed of the electric motor 105 to a desired rotational speed for output by the gear assembly 106. Accordingly, the rotational output of the gear assembly 106 may be an input to a drive assembly 110. Among other components, the drive assembly 110 may include a hammer 112 and an anvil 115. The drive assembly 110 may also include gearing and other mechanical components for translating the rotational output of the gear assembly 106 into a rotational impact output via the anvil 115. In this regard, the drive assembly 110 may include, for example, a spring that stores energy that is abruptly released upon the hammer 112. The hammer 112, which may be operably coupled to the motor 105, may include impact faces that extend into engagement with anvil 115 (and more particularly the ram lugs of the anvil 115) and rotate to impact the anvil 115 to generate rotational impact movement. Such movement may be transferred through the anvil 115 to a head end of the anvil 115 that includes a drive. The drive may be shaped to receive and secure an end effector 120. The end effector 120 may be, for example, a socket, a driver bit, a drill bit, or the like.

Accordingly, with the end effector 120 coupled to the drive of the anvil 115, the impact driver 100 may be configured to act upon a work piece 130 (e.g., a fastener such as a screw, bolt, nut, or the like), for example, secured in an object 131. In this regard, the abrupt and recurring rotational output evoked on the end effector 120 may operate, for example, to loosen the work piece 130 and permit removal, even when the work piece 130 is difficult to remove due to being, for example, rusted into engagement with the object 130.

As such, via the anvil 115, sudden and repeated application of high torque rotational forces may be output by the impact driver 100. For the anvil 115 to be durable and effective over time, the anvil 115, according to some example embodiments, may be optimized for strength, toughness, and hardness (e.g., surface hardness). The strength is indicated by the anvil's ability to be subjected to high torque. Toughness of an anvil is indicated by the duration of the fatigue life of the anvil. Finally, hardness, and more specifically, surface hardness is indicated by the anvil's anti-wear performance. According to some example embodiments, the treatment processes used in conjunction with the materials to form an anvil, as described herein, can be optimized for strength, toughness, and hardness. Accordingly, an increased durability anvil, according to some example embodiments, may be realized that exhibits increased tolerance to high torque, longer fatigue life, and improved anti-wear performance.

Figure 2:
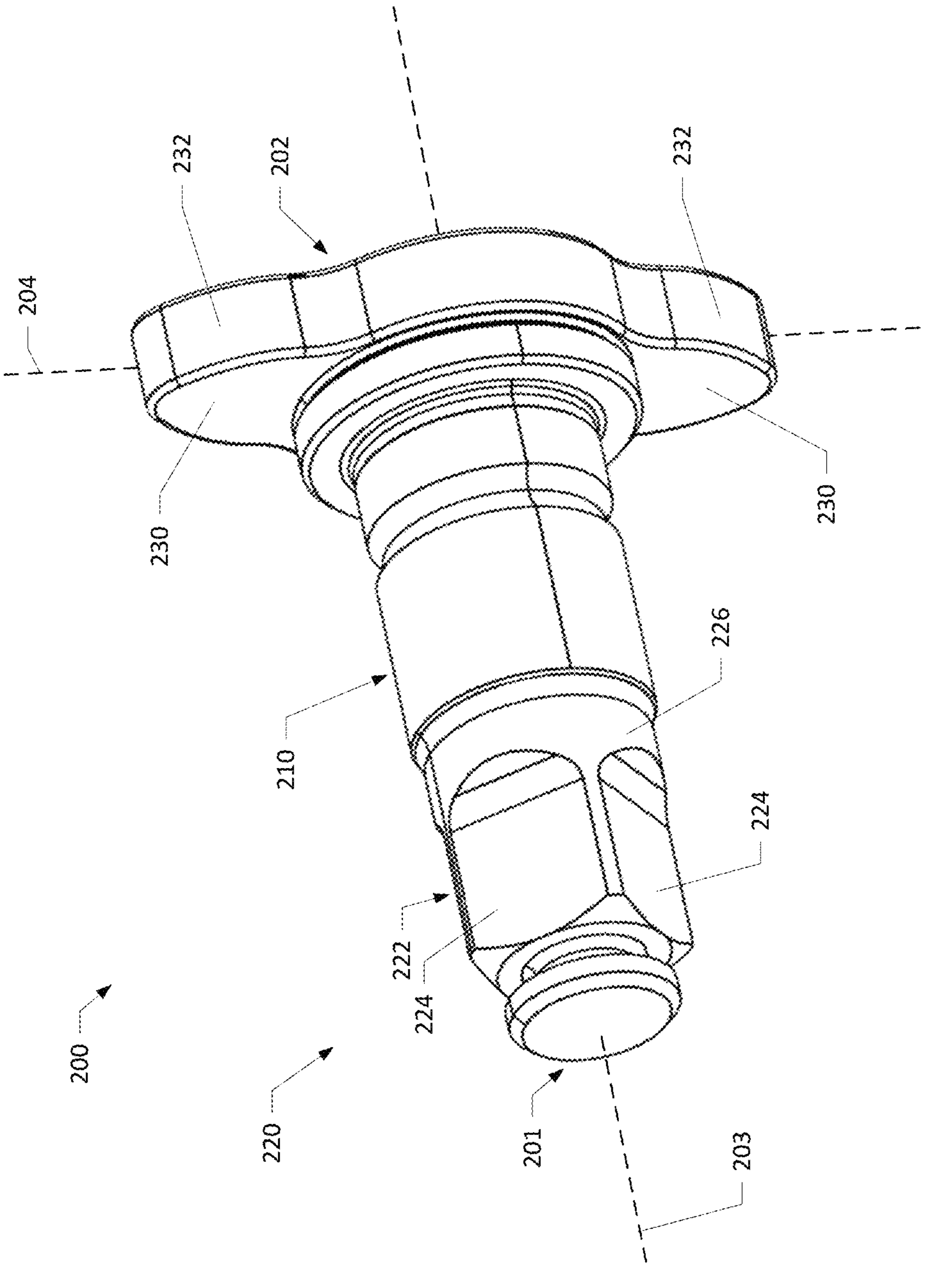
FIG. 2 illustrates an anvil for an impact driver shown in a perspective view according to some example embodiments.

Now referring to FIG. 2, an example embodiment of an anvil 200 is shown in a perspective view. The anvil 200 may be the same or similar to the anvil 115 described above and may be implemented within an impact driver in the same manner as described. In this regard, the anvil 200 may be comprised of a shank 210 and one or more ram lugs 230.

The shank 210 may be formed as a generally cylindrical shape that extends along a longitudinal axis 203 of the anvil 200. Accordingly, the shank 210 may have a first end 201 and a second end 202. A head 220 of the shank 210 may be disposed at the first end 201 of the shank 210 along the longitudinal axis 203.

The head 220 may include a number of features that support the operation of the anvil 200. In this regard, the head 220 may include, for example, a drive 222. The drive 222 may be configured to receive an end effector, as described above. To do so, the drive 222 may comprise a number of adjacent planar surfaces, referred to as end effector engagement surfaces 224. According to some example embodiments, the drive 222 may include four end effector engagement surfaces 224 and have a square profile for receiving, for example, a socket with a square receiving aperture. While the engagement between the end effector and the drive 222 may be a close fit, simply due to manufacturing tolerances and the like, some amount of misalignment forming an imperfect fit is likely to occur. As a result, when impact rotational movement is transferred from the drive 222 of the anvil 200 to the end effector, a high torque impact between the end effector engagement surfaces 224 and the internal surfaces of, for example, the receiving aperture of the end effector may occur. As such, the end effector engagement surfaces 224 may be subjected to repeated high torque impacts during operation of an impact driver creating an area for stress and possible failure.

Additionally, for example, to seat the end effector on the drive 222, the head 220 may also include a drive transition 226. The drive transition 226 may be a portion of the head 220 where the external surface of the drive 222 transitions into a body of the shank 210. According to some example embodiments, the drive transition 226 may include sloped surface that are angled to change from the width of the drive 222 to the width of the body of the shank 210. This drive transition 226 may also come into contact with edges of the end effector when installed on the drive 222. Due to the potential contact between the end effector and the drive transition 226, the drive transition 226 may also be subjected to rotational impacts when the anvil 200 is being rotated by an impact driver (e.g., impact driver 100). As such, the drive transition 226 may form another portion of the anvil 200 where impacts can occur leading to stress and possible failure.

radial axis 204. The radial axis 204 is orthogonal to the longitudinal axis 203 and, in this case, is perpendicular to the longitudinal axis 203.

A ram lug 230 may have a width that forms a side surface of the ram lug 230. The side surface of the ram lug 230 may form a location where the hammer of an impact driver impacts the ram lug 230 to cause the impact rotational movement of the anvil 200. In this regard, the side surface of the ram lug 230 may be referred to as the impact surface 232. Again, because the impact surface 232 may be subjected to repeated blows by the hammer during operation of an impact driver, the impact surface 232 may form a location where the anvil 200 is stressed and may fail. Depending on the direction of rotation of the anvil 200, the impacts on the impact surface 232 may be on different sides of the ram lug 230. As such, the impact surface 232 may extend to both sides of the ram lug 230.

According to some example embodiments, the anvil 200 may be formed of a single material such as steel or a steel alloy. The type of material used, and subjected to the example treatment processes described herein, may result in an anvil 200 that is optimized for strength, toughness, and surface hardening. In this regard, the material used to form the anvil 200 may be a medium-carbon steel. A medium-carbon steel may be a steel alloy that has a carbon content between, for example, 0.26% to 0.60% by weight. As the carbon content of steel increases, the material becomes stronger and harder. However, the material also becomes less ductile and more susceptible to cracking and fracture, particularly in impact-based applications. As such, the use of medium-carbon steel in the context of an impact driver anvil, according to some example embodiments, with example treatment processes applied to particular areas as described herein, has shown to offer a good balance of having harder portions of the anvil in particular locations while permitting other portions of the anvil to still be relatively ductile and strong.

A chromium-nickel-molybdenum (CrNiMo) steel (also referred to as nickel chromium molybdenum steel) may be used as a material for an anvil 200 according to some example embodiments. Some examples of materials that may be used for forming the anvil 200, according to some example embodiments, may include 30CrNiMo8, 30CrNiMo16-6, 30CrNiMo, 36CrNiMo4, 36Cr2Ni4MoA, and 40CrNiMo. Further, AISI 4340, SNCM439, or SNCM630 may be used according to some example embodiments. Additionally. GB 30CrNi4MoA, GB 36Cr2Ni4MoA or EN 30CrNiMo16-6 may be used with Table 1 below showing the amounts of various elemental components of these alloys by percentage weight.

TABLE 1

| | C | Si | Mn | Ni | P | S | Cr | Mo |
|---|---|---|---|---|---|---|---|---|
| 30CrNi4MoA | 0.26-0.33 | 0.10-0.40 | 0.20-0.60 | 3.30-4.30 | 0-0.025 | 0-0.020 | 1.20-1.50 | 0.30-0.60 |
| 36Cr2Ni4MoA | 0.28-0.44 | 0.10-0.60 | 0.20-0.60 | 3.00-4.50 | 0-0.025 | 0-0.020 | 1.20-2.00 | 0.20-0.60 |
| 30NiCrMo16-6 | 0.26-0.33 | 0-0.40 | 0.50-0.80 | 3.30-4.30 | 0-0.025 | 0-0.025 | 1.20-1.50 | 0.30-0.60 |

The anvil 200 may also include one or more ram lugs 230 that extend radially from the second end 202 of the shank 210. In this regard, each ram lug 230 extends radially away from the second end 202 of the shank 210 along a shared or respective radial axis that is orthogonal to the longitudinal axis 203 of the anvil 200. In the example embodiment of FIG. 2, the anvil 200 has two ram lugs 230 that extend radially from the second end 202 of the shank 210 along a Having described the structural configuration and materials that may be used to form the example anvil 200, as well as the portions of the anvil 200 that are subjected to surface stresses during operation of an impact driver, FIG. 3 indicates where, according to some example embodiments, on the example anvil 200 a treatment process may be applied to increase the hardness of the surface of the anvil 200. In this regard, FIG. 3 is a side view of the anvil 200 with the hatched areas indicating locations where a treatment process, according to some example embodiments, may be applied.

In this regard, the surface 300 may be a first area where an example treatment process may be applied. As shown in FIG. 3, surface 300 is disposed at the second end 202 of the shank 210 and includes the sides of the ram lugs 230 or the impact surfaces 232. The surface 300 also includes, according to some example embodiments, the sides of a more central portion of the shank 210 at the second end 202, which may be referred to as the flange of the shank 210. As such, according to some example embodiments, the surface 300 for applying a treatment processes may extend about an entire perimeter of the ram lugs 230 and the flange portion of the shank 210.

Figure 3:
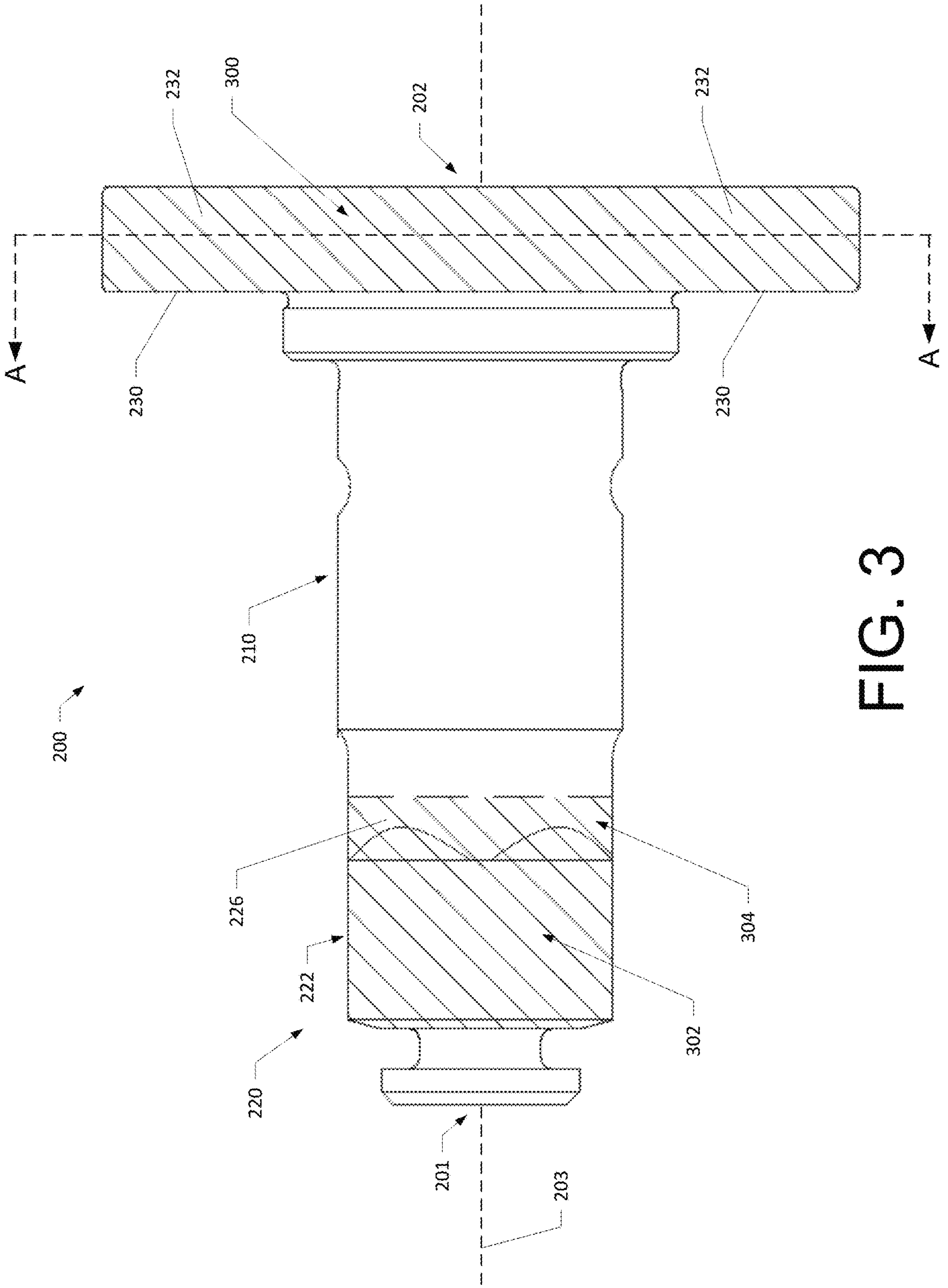
FIG. 3 illustrates a side view of the anvil of FIG. 2 indicating treatment areas according to some example embodiments.
Figure 4:
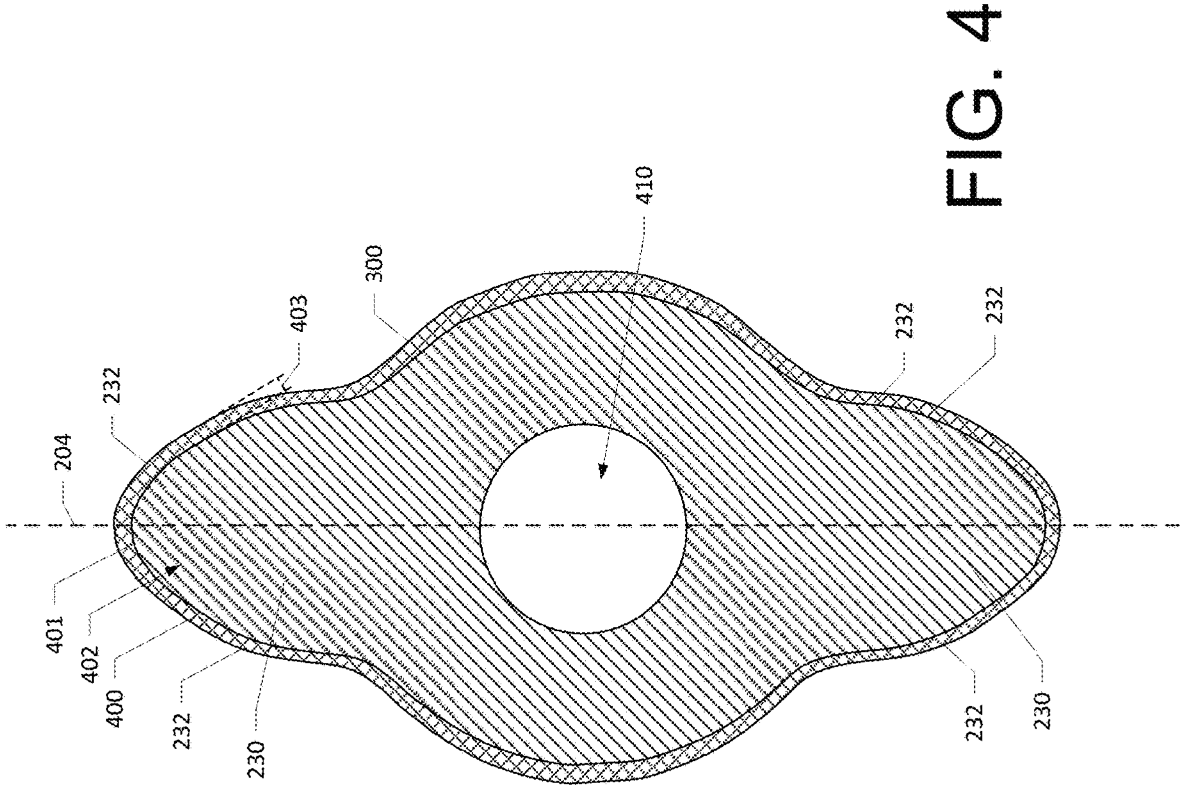
FIG. 4 illustrates a cross-section of the anvil shown in FIG. 3 taken at A-A according to some example embodiments.

FIG. 4 provides a cross-section of the anvil 200, taken at A-A in FIG. 3, adjacent to the second end 202 to illustrate the surface 300. Accordingly, via the treatment process, a hardened layer, referred to as the impact layer 400 may be formed at least on the sides of the ram lugs 230 at the impact surfaces 232 of the ram lugs 230. According to some example embodiments, as shown in FIG. 4, the impact layer 400 may extend around the flange portion of the shank 210, as well as around the ram lugs 230. The impact layer 400 may have an impact layer depth that may be a function of the parameters of the treatment process as further described below. Accordingly, the impact layer 400 may extend from the impact surfaces 232 toward an internal region 402 of the ram lug 230. An impact layer transitional material interface 401 may define a depth 403 at which the impact layer 400 transitions into the internal region 402 of the ram lug 230 and the hardness of the material changes. As such, the impact layer 400 may have a first hardness (e.g. within a ranges of about HRC 55 to 62, or about HV 585 to 750, or about HRA 78.4 to 82.5) that is greater than a second hardness of the internal region 402 of the ram lug 230 (e.g, within ranges of about HRC 38 to 52, or about HV 370 to 550, or about HRA 69 to 77), which was unaffected by at least portions of the treatment process. Additionally, the anvil 200 may include a cavity 410 (not previously shown) that operates to hold and stabilize the anvil 200 within the housing of an impact driver during operation.

Referring back to FIG. 3, other surfaces that may be subjected to a treatment process are surfaces 302 and 304. Surface 302 is associated with the end effector engagement surfaces 224 of the drive 222, and surface 304 is associated with the drive transition 226. Due to these surfaces being subjected to impacts with an end effector during operation of an impact driver, these surfaces may also benefit from being hardened through the example treatment process to increase the durability of the anvil 200. As such, a hardened engaging layer may be formed at the surface 302 and, in some example embodiments, at the surface 304 as further described below.

Figure 5:
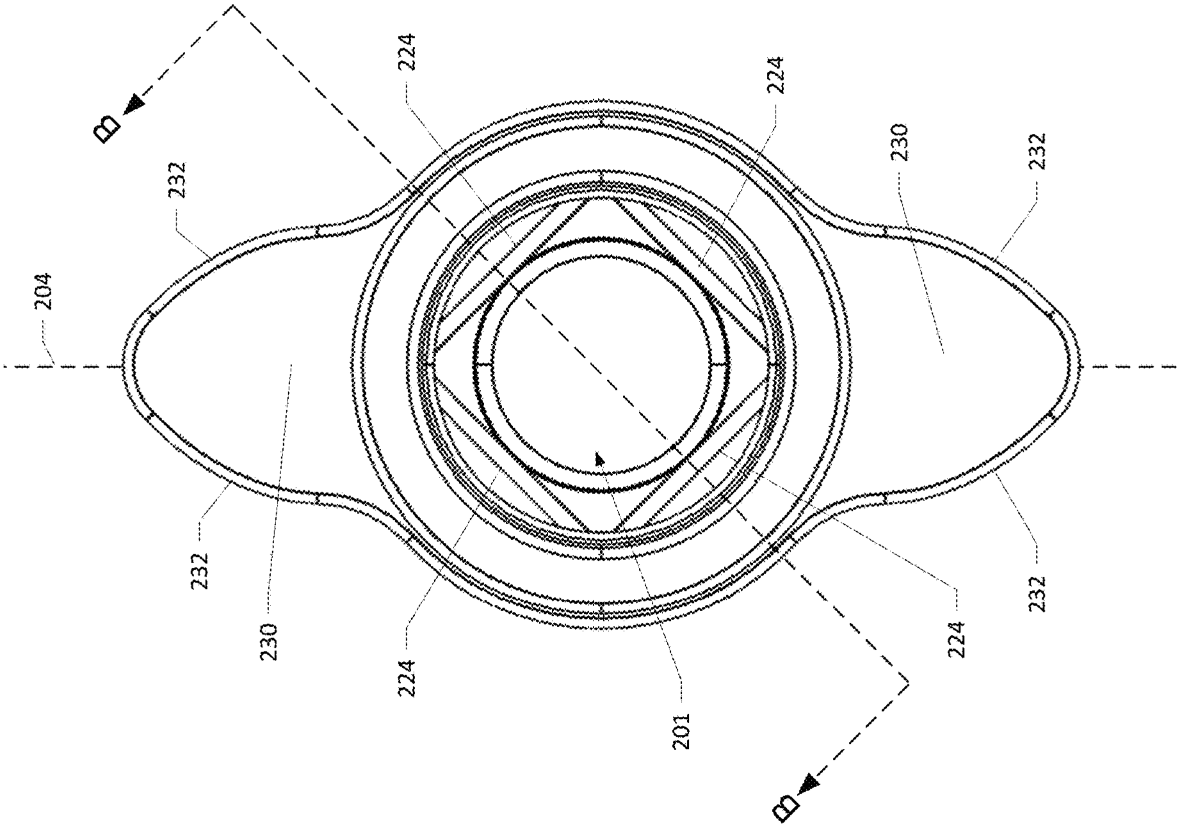
FIG. 5 illustrates a front view of the anvil of FIG. 2 according to some example embodiments.
Figure 6:
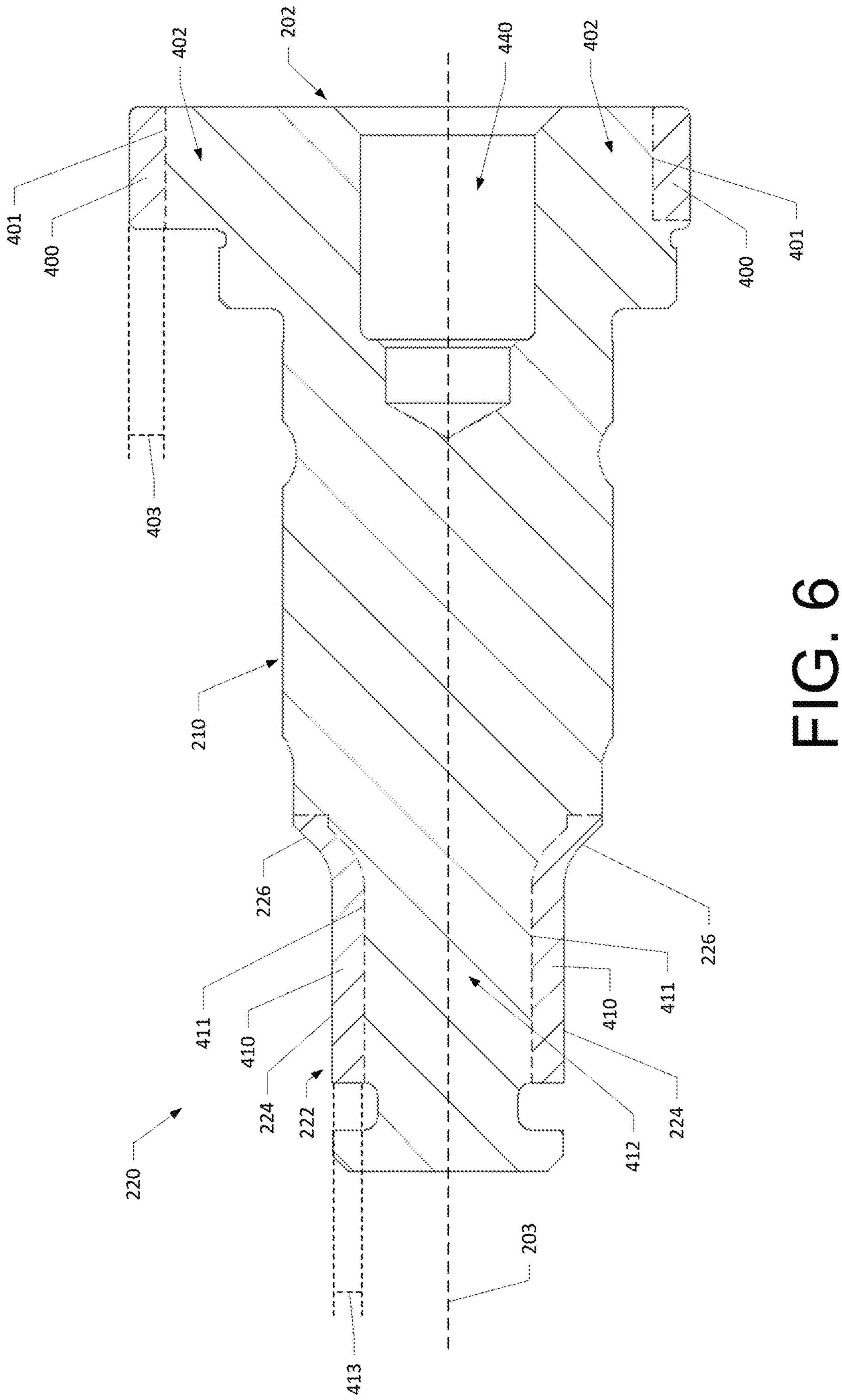
FIG. 6 illustrates a cross-section of the anvil of FIG. 5 taken at B-B according to some example embodiments.

To illustrate the engaging layer, FIG. 5, which is a front view of the anvil 200, is provided to define a cross-section B-B taken through the longitudinal axis 203 of the anvil 200. As such, FIG. 6 shows a cross-section of the anvil 200 taken at B-B of FIG. 5 with the engaging layer 410 shown extending internally from the end effector engagement surfaces 224 and the drive transition 226 towards an internal region 412 of the drive 222 or the head 220. Similar to the impact layer 400, the engaging layer 410 extends to an engaging layer transitional material interface 411 where the hardness transitions from the hardness of the engaging layer 410 to the hardness of the internal region 412. Again, the engaging layer 410 may have a first hardness (e.g. within a ranges of about HRC 55 to 62, or about HV 585 to 750, or about HRA 78.4 to 82.5) that is greater than a second hardness of the internal region 412 (e.g, within ranges of about HRC 38 to 52, or about HV 370 to 550, or about HRA 69 to 77) that was unaffected by the treatment process.

Additionally, the engaging layer depth 413 is shown with the engaging layer depth 413 being defined as the distance between the end effector engagement surfaces 224 or the surface of the drive transition 226 and the engaging layer transitional material interface 411. Additionally, the depth 403 of the impact layer 400 is more clearly shown with the impact layer depth 403 being defined as the distance between the impact surfaces 232 or the surface of the flange portion of the shank 210 and the impact layer transitional material interface 401. The impact layer depth 403 and engaging layer depth 413 may be determined by parameters of the example treatment process. Additionally, through testing, useful and preferable depth ranges for the impact layer depth 403 and engaging layer depth 413 may be defined.

In this regard, the impact layer depth 403 may be, according to some example embodiments, within a range from about 0.5 millimeters to about 2.5 millimeters. Alternatively, according to some example embodiments, the impact layer depth 403 may be within a range from about 1.4 millimeters to about 2.0 millimeters. Further, the engaging layer depth 413 may, according to some example embodiments, be within a range from about 0.5 millimeters to about 2.5 millimeters. According to some example embodiments, the engaging layer depth 413 may alternatively be within a range from about 1.2 millimeters to about 1.5 millimeters. As such, according to some example embodiments, the impact layer depth 403 may be greater than the engaging layer depth 413. One of skill would appreciate that the depths of the layers may be determined by balancing the anti-wear characteristics associated with greater depth layers with the negative effect of a reduction in toughness of the material that can result from larger depth layers.

Figure 7:
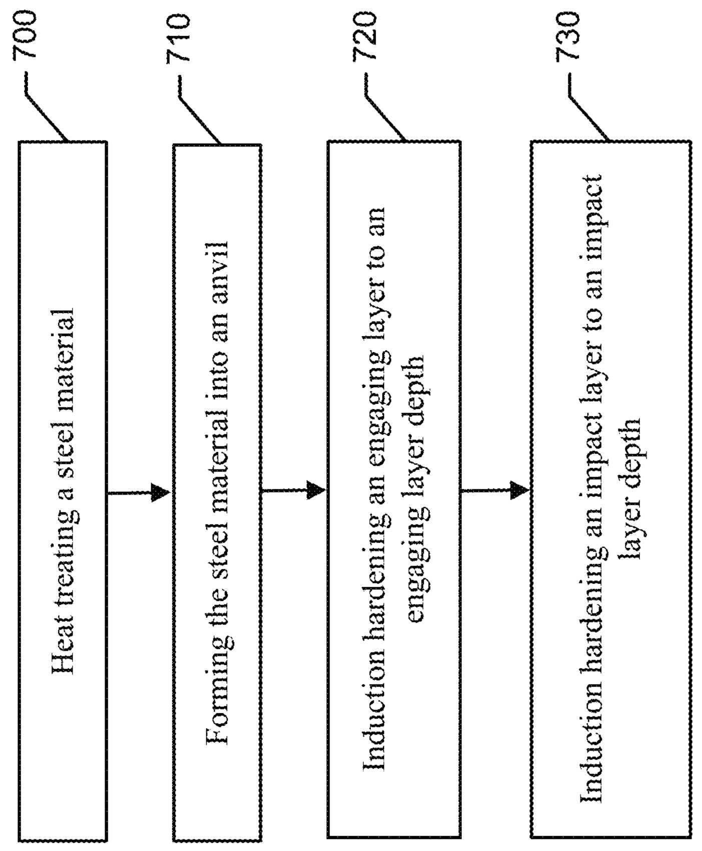
FIG. 7 illustrates a flow chart of a method of making an anvil according to some example embodiments.

Having described the structure of the anvil 200 and the features resulting from example treatment processes described herein, FIG. 7 provides a flow chart for a method of making the anvil 200 that comprises performing example treatment processes to form the impact layer 400 and the engaging layer 410. According to some example embodiments, prior to heat treating at 700, a steel material may be cut to a workable size for making the anvil 200. According to some example embodiments, the steel material may be a medium-carbon steel or chromium-nickel-molybdenum steel.

Subsequently, at 700, the steel material may be heat treated. The heat treatment may comprise annealing the steel material, hot forging, and normalization. The annealing operation may be performed on the steel material to remove internal stresses and toughen the material. In this regard, annealing may include heating the steel material to a temperature above the material's recrystallization temperature for a period of time and then air cooling the steel material. Additionally, hot forging may be performed to begin shaping the steel material into the anvil 200. In this regard, the steel material may be heated to, for example, 75% of the material's melting temperature and then hammering and otherwise impact forming the steel materials may be performed. Also, a normalization operation may be performed, where the steel material is again annealed via heating above the material's critical point (e.g., 20 to 50 degrees Celsius above the material's critical point) and air cooling.

After the heat treatment at 700, the steel material may be formed into the anvil 200. In this regard, for example, the steel material may be machined into the shape of the anvil 200. The machining process may be involve cutting the steel material into the shape of the anvil 200. After the anvil 200 is formed, additional treatments may be performed. For example, a cryogenic operation may be performed where the anvil 200 is hardened by cooling the anvil 200 to very low temperatures (e.g., negative 185 degrees Celsius) to increase an amount of martensite in the crystal structure of the material of the anvil 200. Tempering may also be performed to by, again, heating the anvil 200 and permitting cooling to reduce internal stresses.

At 720 and 730, induction hardening (also referred to as high frequency or induction quenching) may be performed to form the engaging layer 410 and the impact layer 400. In this regard, via the induction hardening, the engaging layer 410 and the impact layer 400 may be hardened to a first hardness (e.g. within a ranges of about HRC 55 to 62, or about HV 585 to 750, or about HRA 78.4 to 82.5) that is greater than the hardness of the material elsewhere in the anvil 200, which has a second hardness (e.g, within ranges of about HRC 38 to 52, or about HV 370 to 550, or about HRA 69 to 77) that is less than the first hardness. The induction hardening process may be performed to realize the depths of the engaging layer 410 and the impact layer 400 described above, (e.g., layer depth ranging from about 0.5 millimeters to about 2.5 millimeters). Further, the induction hardening may involve heating or cooling, according to some example embodiments, only the necessary area of the anvil 200 at the engaging layer 410 and the impact layer 400 by using a high-frequency electrical current (e.g., with a frequency of 10 kHz to 1000 kHz) to form the engaging layer 410 and the impact layer 400. The temperature may also be controlled during the induction hardening process. The induction hardening process may create, at these locations, a surface hardened layer (e.g., layer depth ranging from about 0.5 millimeters to about 2.5 millimeters) with higher hardness and improved wear resistance. As a result of the induction hardening the engaging layer 410 and impact layer 400 may be formed while the other portions of the anvil 200, including the interior regions, maintain their structure.

Subsequent to performing induction hardening a shot peening operation may be performed. The shot peening may form a compressive stress layer on the exterior of the anvil 200. Additionally, any final machining or grinding of the anvil 200 may be performed.

As such, according to some example embodiments, an anvil for use with a power tool is provided. The anvil may comprise a shank extending along a longitudinal axis of the anvil. The shank may have a first end and a second end. The anvil may further comprise a ram lug may extend radially from the second end of the shank along a radial axis. The radial axis may be orthogonal to the longitudinal axis. The ram lug may comprise an impact surface configured to receive an impact force from a hammer of the power tool and an impact layer comprising the impact surface. The impact layer may have been formed via a treatment process to have an impact layer depth to an impact layer transitional material interface with an interior region of the ram lug. The impact layer may have a first hardness and the interior region of the ram lug may have a second hardness. The first hardness may be greater than the second hardness.

The example anvil described above may be modified, augmented, or may include optional additions, some of which are described herein. The modifications, augmentations or optional additions listed below are some examples of elements that may be added in any desirable combination. Within this context, the example anvil as described above may be considered a first embodiment, and other embodiments may be defined by each respective combination of modifications, augmentations or optional additions. For example, in a second embodiment the impact layer depth may be within a range from about 0.5 millimeters to about 2.5 millimeters. Alternatively, a third embodiment may include an impact layer depth that may be within a range from about 1.4 millimeters to about 2.0 millimeters. For a fourth embodiment, the shank may further comprise a head portion at the first end of the shank, and the head portion may comprise a drive. The drive may comprise a plurality of planar end effector engaging surfaces configured to engage with an end effector that is configured to be rotated by the drive to operate on a work piece. The fourth embodiment may be combined with any or all of embodiments one to three, as appropriate. In a fifth embodiment, the drive may further comprise an engaging layer that comprises the end effector engaging surfaces. The engaging layer may have been formed via a treatment process to have an engagement layer depth to an engaging layer transitional material interface with an interior region of the drive. The engaging layer may have the first hardness and the interior region of the drive may have the second hardness. The fifth embodiment may be combined with any or all of embodiments one to four, as appropriate. In a sixth embodiment, the engaging layer depth may be within a range from about 0.5 millimeters to about 2.5 millimeters. The sixth embodiment may be combined with any or all of embodiments one to five, as appropriate. In a seventh embodiment, the engaging layer depth may be within a range from about 1.2 millimeters to about 1.5 millimeters. The seventh embodiment may be combined with any or all of embodiments one to six, as appropriate. In an eighth embodiment, the first hardness may be within a range from about HRC 55 to about HRC 62 and the second hardness may be within a range from about HRC 38 to about HRC 52. The eighth embodiment may be combined with any or all of embodiments one to seven, as appropriate. In a ninth embodiment, the first hardness may be within a range from about HV 585 to about HV 750 or within a range from about HRA 78.4 to about HRA 82.5, and the second hardness may be within a range from about HV 370 to about HV 550 or within a range from about HRA 69 to about HRA 77. The ninth embodiment may be combined with any or all of embodiments one to eight, as appropriate.

According to some example embodiments, another example embodiment of an anvil for use with a power tool is provided. The example anvil may comprise a shank extending along a longitudinal axis of the anvil. The shank may have a first end and a second end. The shank may comprise a head portion at the first end. The head portion may comprise a drive, and the drive may comprise a plurality of planar end effector engaging surfaces configured to engage with an end effector that is configured to be rotated by the drive to operate on a work piece. The example anvil may further comprise a ram lug extending from the second end of the shank along a radial axis from the shank and may comprise an impact surface for receiving an impact force from a hammer of the power tool. The radial axis may be orthogonal to the longitudinal axis. Further, the drive may comprise an engaging layer having been formed via a treatment process to have an engaging layer depth to an engaging layer transitional material interface with an interior region of the drive. The engaging layer may comprise a plurality of planar end effector engaging surfaces configured to engage with the end effector. The engaging layer may have a first hardness and the interior region of the drive may have a second hardness, where the first hardness is greater than the second hardness.

The example anvil described above may be modified, augmented, or may include optional additions, some of which are described herein. The modifications, augmentations or optional additions listed below are some examples of elements that may be added in any desirable combination. Within this context, the example anvil as described above may be considered a tenth embodiment, and other embodiments may be defined by each respective combination of modifications, augmentations or optional additions. For example, in an eleventh embodiment, the engaging layer depth is within a range from about 0.5 millimeters to about 2.5 millimeters. Alternatively, in a twelfth embodiment, the engaging layer depth may be within a range from about 1.2 millimeters to about 1.5 millimeters. The twelfth embodiment may be combined with any or all of embodiments ten to eleven, as appropriate. In a thirteenth embodiment, the anvil may be formed of a medium-carbon steel. The thirteenth embodiment may be combined with any or all of embodiments ten to twelve, as appropriate. In a fourteenth embodiment, the ram lug may comprise an impact layer that has been formed via a treatment process to have an impact layer depth to an impact layer transitional material interface with an interior region of the ram lug. The impact layer may comprise the impact surface, and the impact layer may have the first hardness and the interior region of the ram lug has the second hardness. The impact layer depth may be within a range from about 0.5 millimeters to about 2.5 millimeters. The fourteenth embodiment may be combined with any or all of embodiments ten to thirteen, as appropriate. In a fifteenth embodiment, the anvil may be formed of a chromium-nickel-molybdenum steel. The fifteenth embodiment may be combined with any or all of embodiments ten to fourteen, as appropriate. In a sixteenth embodiment, the ram lug may comprise an impact layer that has been formed via a treatment process to have an impact layer depth to an impact layer transitional material interface with an interior region of the ram lug. The impact layer may comprise the impact surface, and the impact layer may have the first hardness and the interior region of the ram lug has the second hardness. The impact layer depth may be within a range from about 0.5 millimeters to about 2.5 millimeters. The sixteenth embodiment may be combined with any or all of embodiments ten to fifteen, as appropriate.

According to some example embodiments, an example method for making an anvil for use with a power tool is provided. The example method may comprise heat treating a steel material and forming the steel material into the anvil. The example method may further comprise induction hardening, to a first hardness, an engaging layer formed on a drive of the anvil to an engaging layer depth defined at an engaging layer transitional material interface with an interior region of the drive. The drive may be a component of a head of a shank disposed at a first end of the shank, and the shank may extend along a longitudinal axis of the anvil. The engaging layer may comprise a plurality of planar end effector engaging surfaces of the drive configured to receive an end effector that is configured to be rotated by the drive to operate on a work piece. The example method may further comprise induction hardening, to the first hardness, an impact layer formed on a ram lug of the anvil to an impact layer depth defined at an impact layer transitional material interface with an interior region of the ram lug of the anvil. The impact layer may comprise an impact surface configured to receive an impact force from a hammer of the power tool. The ram lug may extend radially from a second end of the shank along a radial axis that is orthogonal to the longitudinal axis of the anvil. The interior region of the drive and the interior region of the ram lug may have a second hardness, and the first hardness may be greater than the second hardness.

The example method described above may be modified, augmented, or may include optional additions, some of which are described herein. The modifications, augmentations or optional additions listed below are some examples of elements that may be added in any desirable combination. Within this context, the example method as described above may be considered a seventeenth embodiment, and other embodiments may be defined by each respective combination of modifications, augmentations or optional additions. For example, in an eighteenth embodiment, the steel material may be a medium-carbon steel. Alternatively or additionally, in a nineteenth embodiment, the steel material may be a chromium-nickel-molybdenum steel. The nineteenth embodiment may be combined with any or all of embodiments seventeen to eighteen, as appropriate. In a twentieth embodiment, the engaging layer depth may be within a range from about 0.5 millimeters to about 2.5 millimeters, and the impact layer depth may be within a range from about 0.5 millimeters to about 2.5 millimeters. The twentieth embodiment may be combined with any or all of embodiments seventeen to nineteen, as appropriate.

According to some example embodiments, an impact driver is provided. The impact driver may comprise a motor configured to output rotational movement in response to operation of a control switch, a hammer operably coupled to the motor to generate rotational movement of the hammer, and an anvil configured to receive an end effector for acting upon a work piece. The anvil may comprise a shank extending along a longitudinal axis of the anvil. The shank may have a first end and a second end. The anvil may further comprise a ram lug may extend radially from the second end of the shank along a radial axis. The radial axis may be orthogonal to the longitudinal axis. The ram lug may comprise an impact surface configured to receive an impact force from a hammer of the power tool and an impact layer comprising the impact surface. The impact layer may have been formed via a treatment process to have an impact layer depth to an impact layer transitional material interface with an interior region of the ram lug. The impact layer may have a first hardness and the interior region of the ram lug may have a second hardness. The first hardness may be greater than the second hardness.

The example impact driver described above may be modified, augmented, or may include optional additions, some of which are described herein. The modifications, augmentations or optional additions listed below are some examples of elements that may be added in any desirable combination. Within this context, the example method as described above may be considered a twenty-first embodiment, and other embodiments may be defined by each respective combination of modifications, augmentations or optional additions. For example, in a twenty-second embodiment, the impact layer depth may be within a range from about 0.5 millimeters to about 2.5 millimeters. Alternatively, in a twenty-third embodiment, the impact layer depth may be within a range from about 1.4 millimeters to about 2.0 millimeters. In a twenty-fourth embodiment, the shank may further comprise a head portion at the first end of the shank. The head portion may comprise a drive, and the drive may comprise a plurality of planar end effector engaging surfaces configured to engage with an end effector that is configured to be rotated by the drive to operate on a work piece. The drive may further comprise an engaging layer that comprises the end effector engaging surfaces, and the engaging layer may have been formed via a treatment process to have an engagement layer depth to an engaging layer transitional material interface with an interior region of the drive. The engaging layer may have the first hardness and the interior region of the drive has the second hardness. The twenty-fourth embodiment may be combined with any or all of embodiments twenty-one to twenty-three, as appropriate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An anvil for use with a power tool, the anvil comprising:

a shank extending along a longitudinal axis of the anvil, the shank having a first end and a second end; and a ram lug extending radially from the second end of the shank along a radial axis, the radial axis being orthogonal to the longitudinal axis, wherein the ram lug comprises an impact surface configured to receive an impact force from a hammer of the power tool and an impact layer comprising the impact surface, the impact layer having been formed via a treatment process to have an impact layer depth to an impact layer transitional material interface with an interior region of the ram lug;

wherein the impact layer has a first hardness and the interior region of the ram lug has a second hardness;

wherein the first hardness is greater than the second hardness;

wherein the anvil is formed of a medium-carbon steel having a carbon content between 0.26% to 0.60% by weight or a chromium-nickel-molybdenum steel having a carbon content of 0.26% to 0.44% by weight.

2. The anvil of claim 1, wherein the impact layer depth is within a range from about 0.5 millimeters to about 2.5 millimeters.

3. The anvil of claim 1, wherein the impact layer depth is within a range from about 1.4 millimeters to about 2.0 millimeters.

4. The anvil of claim 3, wherein the shank further comprises a head portion at the first end of the shank;

wherein the head portion comprises a drive, the drive comprising a plurality of planar end effector engaging surfaces configured to engage with an end effector that is configured to be rotated by the drive to operate on a work piece;

wherein the drive further comprises an engaging layer that comprises the end effector engaging surfaces, the engaging layer having been formed via a treatment process to have an engagement layer depth to an engaging layer transitional material interface with an interior region of the drive;

wherein the engaging layer has the first hardness and the interior region of the drive has the second hardness;

wherein the engaging layer depth is within a range from about 1.2 millimeters to about 1.5 millimeters.

5. The anvil of claim 4, wherein the first hardness is within a range from about HRC 55 to about HRC 62 and the second hardness is within a range from about HRC 38 to about HRC 52.

6. The anvil of claim 1, wherein the shank further comprises a head portion at the first end of the shank; wherein the head portion comprises a drive, the drive comprising a plurality of planar end effector engaging surfaces configured to engage with an end effector that is configured to be rotated by the drive to operate on a work piece.

7. The anvil of claim 6, wherein the drive further comprises an engaging layer that comprises the end effector engaging surfaces, the engaging layer having been formed via a treatment process to have an engagement layer depth to an engaging layer transitional material interface with an interior region of the drive; wherein the engaging layer has the first hardness and the interior region of the drive has the second hardness.

8. The anvil of claim 7, wherein the engaging layer depth is within a range from about 0.5 millimeters to about 2.5 millimeters.

9. The anvil of claim 1, wherein the first hardness is within a range from about HV 585 to about HV 750 or within a range from about HRA 78.4 to about HRA 82.5; and wherein the second hardness is within a range from about HV 370 to about HV 550 or within a range from about HRA 69 to about HRA 77.

10. An anvil for use with a power tool, the anvil comprising:

a shank extending along a longitudinal axis of the anvil, the shank having a first end and a second end, the shank comprising a head portion at the first end, the head portion comprising a drive, the drive comprising a plurality of planar end effector engaging surfaces configured to engage with an end effector that is configured to be rotated by the drive to operate on a work piece; and a ram lug extending from the second end of the shank along a radial axis from the shank and comprising an impact surface for receiving an impact force from a hammer of the power tool, the radial axis being orthogonal to the longitudinal axis, wherein the drive comprises an engaging layer having been formed via a treatment process to have an engaging layer depth to an engaging layer transitional material interface with an interior region of the drive, the engaging layer comprising a plurality of planar end effector engaging surfaces configured to engage with the end effector;

wherein the engaging layer has a first hardness and the interior region of the drive has a second hardness;

wherein the first hardness is greater than the second hardness;

wherein the anvil is formed of a medium-carbon steel having a carbon content between 0.26% to 0.60% by weight or a chromium-nickel-molybdenum steel having a carbon content of 0.26% to 0.44% by weight.

11. The anvil of claim 10, wherein the engaging layer depth is within a range from about 0.5 millimeters to about 2.5 millimeters.

12. The anvil of claim 10, wherein the engaging layer depth is within a range from about 1.2 millimeters to about 1.5 millimeters.

13. The anvil of claim 10, wherein the anvil is formed of a chromium-nickel-molybdenum steel having a carbon content of 0.26% to 0.44% by weight.

14. The anvil of claim 13, wherein the ram lug comprises an impact layer that has been formed via a treatment process to have an impact layer depth to an impact layer transitional material interface with an interior region of the ram lug, the impact layer comprising the impact surface; wherein the impact layer has the first hardness and the interior region of the ram lug has the second hardness; wherein the impact layer depth is within a range from about 0.5 millimeters to about 2.5 millimeters.

15. The anvil of claim 10, wherein the anvil is formed a medium carbon steel having a carbon content between 0.26% to 0.60% by weight.

16. The anvil of claim 15, wherein the ram lug comprises an impact layer that has been formed via a treatment process to have an impact layer depth to an impact layer transitional material interface with an interior region of the ram lug, the impact layer comprising the impact surface; wherein the impact layer has the first hardness and the interior region of the ram lug has the second hardness; wherein the impact layer depth is within a range from about 0.5 millimeters to about 2.5 millimeters.

17. An impact driver comprising:

a motor configured to output rotational movement in response to operation of a control switch;

a hammer operably coupled to the motor to generate rotational movement of the hammer; and an anvil configured to receive an end effector for acting upon a work piece;

wherein the anvil comprises:

a shank extending along a longitudinal axis of the anvil, the shank having a first end and a second end; and a ram lug extending radially from the second end of the shank along a radial axis, the radial axis being orthogonal to the longitudinal axis, wherein the ram lug comprises an impact surface configured to receive an impact force from the hammer and an impact layer comprising the impact surface, the impact layer having been formed via a treatment process to have an impact layer depth to an impact layer transitional material interface with an interior region of the ram lug;

wherein the impact layer has a first hardness and the interior region of the ram lug has a second hardness;

wherein the first hardness is greater than the second hardness;

wherein the anvil is formed of a medium-carbon steel having a carbon content between 0.26% to 0.60% by weight or a chromium-nickel-molybdenum steel having a carbon content of 0.26% to 0.44% by weight.

18. The impact driver of claim 17, wherein the impact layer depth is within a range from about 0.5 millimeters to about 2.5 millimeters.

19. The impact driver of claim 17, wherein the impact layer depth is within a range from about 1.4 millimeters to about 2.0 millimeters.

20. The impact driver of claim 17, wherein the shank further comprises a head portion at the first end of the shank; wherein the head portion comprises a drive, the drive comprising a plurality of planar end effector engaging surfaces configured to engage with an end effector that is configured to be rotated by the drive to operate on a work piece; wherein the drive further comprises an engaging layer that comprises the end effector engaging surfaces, the engaging layer having been formed via a treatment process to have an engagement layer depth to an engaging layer transitional material interface with an interior region of the drive; wherein the engaging layer has the first hardness and the interior region of the drive has the second hardness.

* * * * *